(12) United States Patent
Wakamoto et al.

(10) Patent No.: US 7,058,235 B2
(45) Date of Patent: Jun. 6, 2006

(54) IMAGING SYSTEMS, PROGRAM USED FOR CONTROLLING IMAGE DATA IN SAME SYSTEM, METHOD FOR CORRECTING DISTORTION OF CAPTURED IMAGE IN SAME SYSTEM, AND RECORDING MEDIUM STORING PROCEDURES FOR SAME METHOD

(75) Inventors: Setsunobu Wakamoto, Nara (JP);
Kiyoshi Kumata, Kyoto (JP); Tohru Shigeta, Nara (JP); Kenichi Kawakami, Nara (JP); Kohichi Nakano, Nara (JP)

(73) Assignee: Sharp Kabushiki Kaisha, Osaka (JP)

( * ) Notice: Subject to any disclaimer, the term of this patent is extended or adjusted under 35 U.S.C. 154(b) by 624 days.

(21) Appl. No.: 10/071,853

(22) Filed: Feb. 8, 2002

(65) Prior Publication Data

US 2002/0141636 A1    Oct. 3, 2002

(30) Foreign Application Priority Data

Feb. 9, 2001    (JP) .............................. 2001-034691

(51) Int. Cl.
*G06K 9/40* (2006.01)

(52) U.S. Cl. ...................... 382/275; 382/151; 382/255; 382/294; 382/303; 348/36

(58) Field of Classification Search ................ 382/303, 382/275, 294, 255, 151; 348/46, 36
See application file for complete search history.

(56) References Cited

U.S. PATENT DOCUMENTS

| | | | | |
|---|---|---|---|---|
| 5,185,667 A | * | 2/1993 | Zimmermann | ......... 348/207.99 |
| 5,528,194 A | * | 6/1996 | Ohtani et al. | ................ 382/293 |
| 5,675,380 A | * | 10/1997 | Florent et al. | ............... 348/251 |
| 5,760,826 A | | 6/1998 | Nayar | .......................... 348/36 |
| 6,118,474 A | * | 9/2000 | Nayar | .......................... 348/36 |
| 6,130,783 A | | 10/2000 | Yagi et al. | ................... 359/627 |
| 6,304,285 B1 | * | 10/2001 | Geng | ........................... 348/36 |

(Continued)

FOREIGN PATENT DOCUMENTS

JP    06-295333    10/1994

(Continued)

OTHER PUBLICATIONS

European Search Report on European Patent Application No. EP 02 25 0828 dated Apr. 17, 2000.

(Continued)

*Primary Examiner*—Kanjibhai Patel
*Assistant Examiner*—Manav Seth
(74) *Attorney, Agent, or Firm*—David G. Conlin; Edwards Angell Palmer & Dodge LLP

(57) ABSTRACT

An imaging system of the present invention includes: a reflecting mirror having a geometry of one of two sheets of a two-sheeted hyperboloid; and an imaging section which includes an imaging device for receiving light concentrated by a lens having a center located in any position opposing the reflecting mirror on a rotation axis of the reflecting mirror, wherein the imaging system includes a correction section for performing coordinate transformation on captured image data obtained by capturing an image of a prescribed inspection drawing so as to produce a perspective transformed image data and for correcting distortion in the captured image based on a value regarding a distance between a lens position adapted for the coordinate transformation and a light-receiving surface of the imaging device.

18 Claims, 14 Drawing Sheets

U.S. PATENT DOCUMENTS 6,324,297 B1 * 11/2001 Uchida ........................ 382/125
6,366,360 B1 * 4/2002 Ejiri et al. ................... 358/1.9
6,816,625 B1 * 11/2004 Lewis et al. ................. 382/275

FOREIGN PATENT DOCUMENTS

| JP | 09-016755 | 1/1997 |
|---|---|---|
| JP | 2939087 | 6/1999 |
| JP | 11-331654 | 11/1999 |
| JP | 2000-295180 | 10/2000 |
| JP | 200-331168 | 11/2000 |
| WO | WO 00/41024 | 7/2000 |

OTHER PUBLICATIONS

Japanese Office Action dated Sep. 29, 2005.

* cited by examiner

Focus $O_1 = (0, 0, c)$
Focus $O_2 = (0, 0, -c)$
$$\left( c = \sqrt{a^2 + b^2} \right)$$

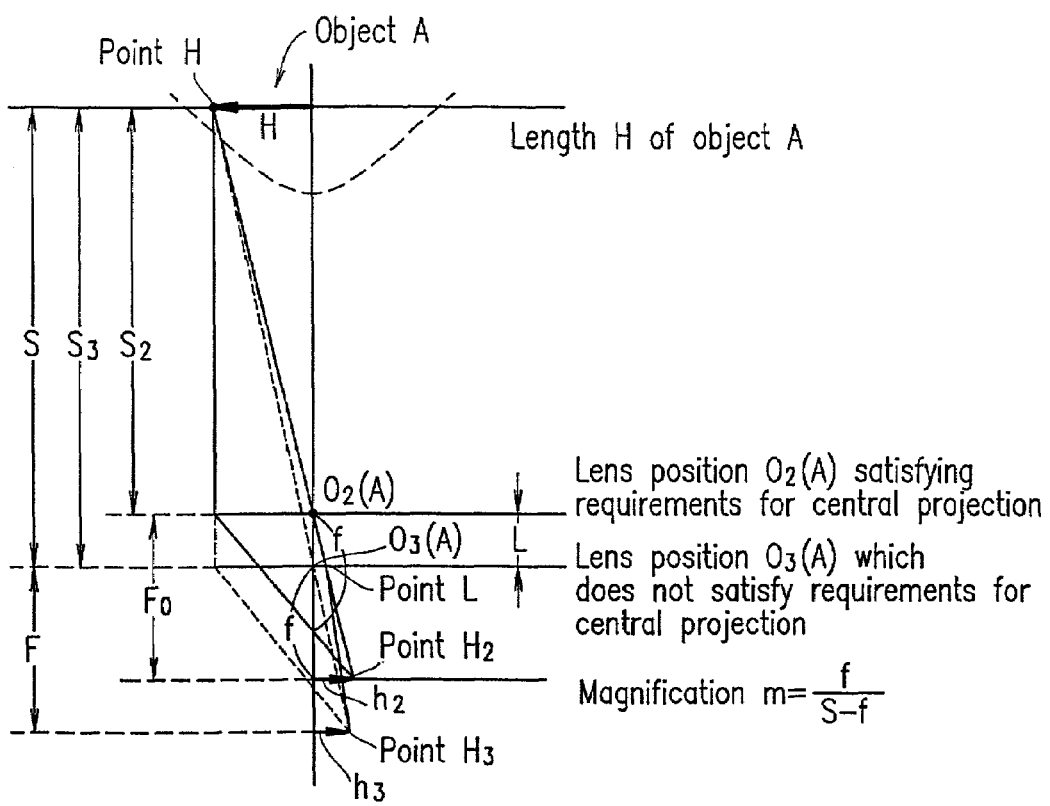

Top view

Perspective view

F value ≪ optimum value
(Pincushion distortion)

Optimum F value

F value ≫ optimum value
(Barrel distortion)

FIG.12 r[α] dot  Example of LUT (α = −30.0° ~ −49.9°)

|     | −30 | −31 | −32 | −33 | −34 | −35 | −36 | −37 | −38 | −39 |
|-----|-----|-----|-----|-----|-----|-----|-----|-----|-----|-----|
| 0   | 56  | 58  | 60  | 62  | 65  | 67  | 69  | 71  | 73  | 75  |
| 0.1 | 57  | 59  | 61  | 63  | 65  | 67  | 69  | 71  | 73  | 75  |
| 0.2 | 57  | 59  | 61  | 63  | 65  | 67  | 69  | 71  | 73  | 75  |
| 0.3 | 57  | 59  | 61  | 63  | 65  | 67  | 69  | 71  | 74  | 76  |
| 0.4 | 57  | 59  | 61  | 63  | 65  | 67  | 70  | 72  | 74  | 76  |
| 0.5 | 57  | 59  | 61  | 63  | 66  | 68  | 70  | 72  | 74  | 76  |
| 0.6 | 58  | 60  | 62  | 64  | 66  | 68  | 70  | 72  | 74  | 76  |
| 0.7 | 58  | 60  | 62  | 64  | 66  | 68  | 70  | 72  | 74  | 77  |
| 0.8 | 58  | 60  | 62  | 64  | 66  | 68  | 70  | 72  | 75  | 77  |
| 0.9 | 58  | 60  | 62  | 64  | 66  | 68  | 71  | 73  | 75  | 77  |

|     | −40 | −41 | −42 | −43 | −44 | −45 | −46 | −47 | −48 | −49 |
|-----|-----|-----|-----|-----|-----|-----|-----|-----|-----|-----|
| 0   | 77  | 79  | 82  | 84  | 86  | 88  | 90  | 93  | 95  | 97  |
| 0.1 | 77  | 80  | 82  | 84  | 86  | 88  | 91  | 93  | 95  | 98  |
| 0.2 | 78  | 80  | 82  | 84  | 86  | 89  | 91  | 93  | 96  | 98  |
| 0.3 | 78  | 80  | 82  | 84  | 87  | 89  | 91  | 93  | 96  | 98  |
| 0.4 | 78  | 80  | 82  | 85  | 87  | 89  | 91  | 94  | 96  | 98  |
| 0.5 | 78  | 80  | 83  | 85  | 87  | 89  | 92  | 94  | 96  | 99  |
| 0.6 | 78  | 81  | 83  | 85  | 87  | 90  | 92  | 94  | 96  | 99  |
| 0.7 | 79  | 81  | 83  | 85  | 88  | 90  | 92  | 94  | 97  | 99  |
| 0.8 | 79  | 81  | 83  | 86  | 88  | 90  | 92  | 95  | 97  | 99  |
| 0.9 | 79  | 81  | 84  | 86  | 88  | 90  | 93  | 95  | 97  | 100 |

IMAGING SYSTEMS, PROGRAM USED FOR CONTROLLING IMAGE DATA IN SAME SYSTEM, METHOD FOR CORRECTING DISTORTION OF CAPTURED IMAGE IN SAME SYSTEM, AND RECORDING MEDIUM STORING PROCEDURES FOR SAME METHOD

BACKGROUND OF THE INVENTION

1. Field of the Invention

The present invention relates to: an imaging system capable of capturing a 360-degree field of view image in a single shooting; software used for controlling data representing the captured image; a method for correcting distortion in an image captured by the imaging system; and a recording medium storing procedures for such a method. From the image captured by the imaging system, space geometry, a configuration of an object, etc., can be correctly perceived. Such an imaging system can be preferably used in wide-ranging fields including the field of security for monitoring stores, banks, etc.; the field of on-vehicle use, such as avoidance of automobile collision, and monitoring of the inside of a vehicle; and the field of measuring instruments for use in a visual section of an industrial robot, for example.

2. Description of the Related Art

In a conventional imaging system capable of capturing a 360-degree field of view image using a hyperboloidal mirror, a reflecting mirror having a geometry of one of two sheets of a two-sheeted hyperboloid (hereinafter, referred to as "the first sheet of a two-sheeted hyperboloid") is used as the hyperboloidal mirror for producing a central projection image. A lens center of a camera is arranged in a focal position of a geometry of the other one of the two sheets of the two-sheeted hyperboloid (hereinafter, referred to as "the second sheet of a two-sheeted hyperboloid") opposed to the first sheet of the two-sheeted hyperboloid (see, for example, Japanese Laid-Open Patent Publication No. 6-295333).

FIG. 2 is a diagram for explaining a two-sheeted hyperboloidal function and its characteristics.

In the imaging system which uses a hyperboloidal mirror having a geometry of the first sheet of a two-sheeted hyperboloid (shown at the top in FIG. 2), where a lens center of a camera is arranged in a position of focus $O_2$ of the second sheet of the two-sheeted hyperboloid (shown at the bottom in FIG. 2), when an object is input (captured) as an image, the input image (captured image) is a central projection image. A positional relationship between the central projection image and the object can be represented by the following Expressions (1) and (2):

$$x = \frac{F \times (b^2 - c^2) \times X}{(b^2 + c^2) \times (Z - c) - 2 \times b \times c \times \sqrt{X^2 + Y^2 + (Z - c)^2}}; \quad (1)$$

$$y = \frac{F \times (b^2 - c^2) \times Y}{(b^2 + c^2) \times (Z - c) - 2 \times b \times c \times \sqrt{X^2 + Y^2 + (Z - c)^2}}. \quad (2)$$

One of advantages of the imaging system using such a hyperboloidal mirror is that the central projection image can be readily transformed into an image in any spatial position around the central projection image.

However, in the conventional imaging system using the hyperboloidal mirror, the lens position for producing the central projection image is limited to one point (focus $O_2$). Thus, it is difficult to align a lens with a position which is optimum for installing the lens.

Moreover, in this lens position (focus $O_2$), in view of performance of the lens, it is not easy to focus the lens on an entire surface of the hyperboloidal mirror for the purpose of capturing an image reflected in the hyperboloidal mirror, since a minimum distance from the lens to a virtual image (an object reflected in the hyperboloidal mirror) formed in the hyperboloidal mirror (a distance between a vertex of the hyperboloidal mirror and the lens) is short. As a result, the central projection image is captured by the conventional imaging system under a condition where the focus is not adjusted to be on the entire surface of the hyperboloidal mirror, rather the focus is adjusted to be only on a partial area of the surface of the hyperboloidal mirror. The area of the surface of the hyperboloidal mirror on which the lens is focused has, for example, a doughnut-shape, and as such the entire central projection image is not captured.

SUMMARY OF THE INVENTION

According to one aspect of the present invention, there is provided an imaging system includes: a reflecting mirror having a geometry of one of two sheets of a two-sheeted hyperboloid; and an imaging section which includes an imaging device for receiving light concentrated by a lens having a center located in any position opposing the reflecting mirror on a rotation axis of the reflecting mirror, wherein the imaging system includes a correction section for performing coordinate transformation on captured image data obtained by capturing an image of a prescribed inspection drawing so as to produce a perspective transformed image data and for correcting distortion in the captured image based on a value regarding a distance between a lens position adapted for the coordinate transformation and a light-receiving surface of the imaging device.

In one embodiment of the invention, the coordinate transformation is performed on the captured image data so as to produce the perspective transformed image data using the following expression:

$$x = \frac{F \times (b^2 - c^2) \times X}{(b^2 + c^2) \times (Z - c) - 2 \times b \times c \times \sqrt{X^2 + Y^2 + (Z - c)^2}}, \quad (1)$$

$$y = \frac{F \times (b^2 - c^2) \times Y}{(b^2 + c^2) \times (Z - c) - 2 \times b \times c \times \sqrt{X^2 + Y^2 + (Z - c)^2}}, \quad (2)$$

(where (X,Y,Z) represents a position of an object, a, b and c are mirror constants, (x,y) represents a coordinate of the captured image, and F represents a distance between the lens position and the light-receiving surface of the imaging device).

In one embodiment of the invention, a squared inspection drawing is used as the inspection drawing.

In one embodiment of the invention, the correction section includes: an image processing section for transforming the captured image data into the perspective transformed image data so as to produce a perspective transformed image; and an operation panel for inputting an instruction to increase or decrease the value regarding the distance between the lens position and the light-receiving surface of the imaging device.

In one embodiment of the invention, the correction section includes: an image processing section for transforming the captured image data into the perspective transformed image data so as to produce a perspective transformed image; and an image recognition section for recognizing whether or not the produced perspective transformed image is distorted by comparing the produced perspective transformed image to an image expected to be obtained when the captured image is a central projection image.

In one embodiment of the invention, the image processing section performs coordinate transformation processing according to an instruction signal output by the operation panel.

In one embodiment of the invention, the image processing section performs coordinate transformation processing according to an instruction signal output by the image recognition section.

In one embodiment of the invention, the image processing section includes: a CPU connected to a bus line; an input buffer memory; a look-up table; an arithmetic processing circuit; and an output buffer memory, wherein: the CPU controls arithmetic processing; the input buffer memory stores captured image data; the look-up table and the arithmetic processing circuit are used for the arithmetic processing; and the output buffer memory includes the image processing section for storing perspective transformed image data.

According to another aspect of the present invention, there is provided a program used for controlling image data in an imaging system, wherein the imaging system includes: a computer; a reflecting mirror having a geometry of one of two sheets of a two-sheeted hyperboloid; and an imaging section which includes an imaging device for receiving light concentrated by a lens having a center located in any position opposing the reflecting mirror on a rotation axis of the reflecting mirror, and the program allows the computer to serve as: a coordinate transformation section for performing coordinate transformation on captured image data obtained by capturing an image of a prescribed inspection drawing so as to produce perspective transformation image data; a correction section for correcting distortion in the captured image based on a value regarding a distance between a lens position adapted for the coordinate transformation and a light-receiving surface of the imaging device.

According to still another aspect of the present invention, there is provided a method for correcting a captured image in an imaging system, wherein the imaging system includes: a reflecting mirror having a geometry of one of two sheets of a two-sheeted hyperboloid; and an imaging device for receiving light concentrated by a lens having a center located in any position opposing the reflecting mirror on a rotation axis of the reflecting mirror, the method includes: a first step of storing captured image data obtained by capturing an image of a prescribed inspection drawing in an input buffer memory; a second step of performing coordinate transformation on the captured image data stored in the input buffer memory using an arithmetic processing circuit so as to produce perspective transformed image data and storing the perspective transformed image data in an output buffer memory; and a third step of displaying an image produced from the perspective transformed image data stored in the output buffer memory on a monitor, the image being confirmed by an inspector, wherein: when a perspective transformed image obtained by capturing an image of a squared inspection drawing is determined to be distorted at the third step, the inspector inputs to an operation panel an instruction to increase or decrease a value regarding a distance between the lens position and the light-receiving surface of the imaging device such that the operation panel outputs an instruction signal to change the value regarding the distance between the lens position and the light-receiving surface of the imaging device; and the first through third steps are repeated.

According to still another aspect of the present invention, there is provided a method for correcting a captured image in an imaging system, wherein the imaging system includes: a reflecting mirror having a geometry of one of two sheets of a two-sheeted hyperboloid; and an imaging device for receiving light concentrated by a lens having a center located in any position opposing the reflecting mirror on a rotation axis of the reflecting mirror, the method includes: a first step of storing captured image data obtained by capturing an image of a prescribed inspection drawing in an input buffer memory; a second step of performing coordinate transformation, according to an instruction from a CPU responding to an instruction signal output by an image recognition section, on the captured image data stored in the input buffer memory using an arithmetic processing circuit so as to produce perspective transformed image data and storing the perspective transformed image data in an output buffer memory; and a third step for comparing the perspective transformed image data stored in the output buffer memory to expected image data obtained when a captured image is a central projection image by using the image recognition section, wherein: when a perspective transformed image obtained by capturing an image of a squared inspection drawing is determined to be distorted at the third step, the image recognition section outputs the instruction signal so as to change the value regarding the distance between the lens position and the light-receiving surface of the imaging device; and the first through third steps are repeated.

According to still another aspect of the present invention, there is provided an imaging system for transforming captured image data into perspective transformed image data using a value regarding a distance between a light-receiving surface of an imaging device and a lens position used when a perspective transformed image obtained by capturing an image of a prescribed inspection drawing is not determined to be distorted by a method for correcting distortion of a captured image according to claim 11.

According to still another aspect of the present invention, there is provided an imaging system for transforming captured image data into perspective transformed image data using a value regarding a distance between a light-receiving surface of an imaging device and a lens position used when a perspective transformed image obtained by capturing an image of a prescribed inspection drawing is not determined to be distorted by a method for correcting distortion of a captured image according to claim 12.

According to still another aspect of the present invention, there is provided a recording medium storing procedures for a method for correcting distortion of a captured image according to claim 11.

According to still another aspect of the present invention, there is provided a recording medium storing procedures for a method for correcting distortion of a captured image according to claim 12.

Hereinafter, effects of the present invention are described.

In an imaging system using a hyperboloidal mirror, in view of performance of a lens, it is difficult to focus the lens onto an entire surface of the hyperboloidal mirror for the purpose of capturing an entire image reflected in the hyperboloidal mirror. This is because a minimum distance from an object reflected in the hyperboloidal mirror to a lens position (a focus position of the second sheet of a two-sheeted hyperboloid) satisfying requirements for central projection is short. In order to focus the lens onto the entire surface of the hyperboloidal mirror, use of a specially-processed wide-angle imaging lens is considered. In practice, the focus is not satisfactorily adjusted by only using the lens, and thus, in order to adjust the focus, the lens is stopped down as much as possible using an aperture diaphragm. However, when the lens is excessively stopped down using an aperture diaphragm, luminance of an input image to be produced is dull and conditions for capturing an image are limited. Thus, such a specially-processed wide-angle imaging lens is less applicable.

Thus, in the present invention, a lens position of a camera (imaging section) is shifted from a focus position (i.e., a position under such conditions as to satisfy the requirements for the central projection in geometric optics) of the second sheet of a two-sheeted hyperboloidal mirror so as to be away from the hyperboloidal mirror. As a result, an entire virtual image reflected in the hyperboloidal mirror is placed within the depth of focus of a lens, and thus it is possible to focus the lens onto an entire surface of the hyperboloidal mirror. Moreover, according to the present invention, even when the lens position is shifted from the focus position of the second sheet of the two-sheeted hyperboloidal mirror, it is possible to correct distortion of a captured image (input image) and transform such an image into a central projection image.

Even when the lens is located so as to geometrically satisfy the requirements for central projection, there is a possibility that the position for satisfying the requirements for an apparent central projection is shifted due to a distortional aberration of the lens. In such a case, conventionally, the lens position is mechanically adjusted so as to satisfy the requirements for the central projection, where such optical adjustments are difficult and time-consuming.

On the other hand, according to the present invention, the lens is preadjusted in a prescribed position. A prescribed inspection drawing (e.g., a squared inspection drawing) is captured as an image and coordinate transformation is performed on data representing the captured image so as to produce perspective transformed image data. When an image represented by the produced perspective transformed image data is distorted, a value (F value) regarding a distance between the lens position adapted for coordinate transformation and a light-receiving surface of a camera (imaging section) is increased or decreased.

Accordingly, when performing image processing, it is possible to readily satisfy the requirements for the central projection using software, thereby shortening the step of optical adjustment. Additionally, it is possible to improve adjustment accuracy for producing a central projection image.

In order to correct distortion in a captured image, it is applicable to a device (correction section) including: an image processing section for transforming data representing the captured image into perspective transformed image data so as to produce a perspective transformed image, and a section provided with an operation panel for inputting an amount of distortion to be corrected when the produced perspective transformed image is distorted.

For example, by presetting keys on the operation panel such that the F value is increased or decreased by a constant amount when a corresponding key is operated, at step 4 of the method shown in FIG. 9, which will be described in an example below, whether or not the type of the distortion in the image is barrel distortion (distorted along a "+" direction) is determined. When the distortion is determined to be barrel distortion, at step 6, a key to decrease the F value is operated. A control signal to decrease the F value is transmitted to the image processing section and the procedure returns to step 2. Based on the decreased F value, arithmetic processing is performed again using Expressions (1) and (2) described above, so that the perspective transformed image is displayed again. At step 3, whether or not the image is distorted is confirmed again. When the image is distorted, the procedure returns to step 4.

Alternatively, when the type of the distortion in the image is determined to be pincushion distortion (distorted along a "−" direction) at step 4, a key to increase the F value is operated at step 5. A control signal to increase the F value is transmitted to the image processing section and the procedure returns to step 2. Based on the increased F value, arithmetic processing is performed again using Expressions (1) and (2), so that the perspective transformed image is displayed again. At step 3, whether or not the image is distorted is confirmed again. When the image is distorted, the procedure returns to step 4.

The above-described procedure is repeated until the distortion is eliminated from the image. When the distortion is eliminated, the procedure ends. In the above-described case, it is also possible to input a changed F value, which is estimated from an amount of the distortion, directly from the operation panel, rather than inputting an instruction using the operation panel to increase or decrease the F value.

In order to correct distortion in a captured image, it is applicable to a device (correction section) including: an image processing section for transforming data representing the captured image into perspective transformed image data so as to produce a perspective transformed image, and an image recognition section for recognizing whether or not the perspective transformed image is distorted by comparing the produced perspective transformed image to an image expected to be obtained when the captured image is a central projection image. Therefore, at the step of correcting the F value as described above, by using the image recognition section, it is also possible to automatically determine whether or not the image is distorted and the distorted direction (i.e., whether or not the type of the distortion is the barrel distortion), although, in a conventional system, such determination is manually carried out.

Alternatively, by directly connecting the operation panel or the image recognition section to the image processing section such that the image processing section is allowed to perform coordinate transformation processing on the captured image according to an instruction signal from the operation panel or the image recognition section, it is also possible to automatically correct the F value.

Specifically, the image recognition section determines whether or not the image is distorted and also determines an amount of the distortion. The image recognition section automatically transmits a signal representing a correction value, which corresponds to the amount of the distortion, to the image processing section so as to cause the image processing section to perform arithmetic processing again based on the correction value. As a result, an image corresponding to the correction value is displayed. The image recognition section, again, automatically repeats the operation of determining whether or not the image is distorted and determining an amount of the distortion. Such operation can be repeated until the distortion is reduced to a prescribed value or lower.

For the image processing section, it is applicable to a device including: a CPU for controlling arithmetic processing operations; an input buffer memory for storing captured image data; an LUT (Look-Up Table) used for arithmetic processing; an arithmetic processing circuit; and an output buffer memory for storing perspective transformed image data. In such a device, these components are connected to a bus line. Thus, it is possible to greatly improve the speed of the image processing, as compared to image processing using software, and it is also possible to allow captured images to be animated without degrading the quality of the images.

A program according to the present invention allows a computer to serve as: a coordinate transformation section for performing coordinate transformation on image data obtained by capturing an image of a prescribed inspection drawing so as to produce perspective transformed image data; and a distortion correction section for performing the coordinate transformation on the produced perspective transformed image data by increasing or decreasing a value regarding a distance between a lens position adapted for the coordinate transformation and a light receiving surface according to the type of the distortion when a perspective transformed image produced from the perspective transformed image data is distorted, so that it is possible to automatically perform correction processing.

In the imaging system according to the present invention, when correcting distortion of a captured image, a prescribed inspection drawing (e.g., a squared inspection drawing) is captured as an image and the captured image data is stored in the input buffer memory of the image processing section. The arithmetic processing circuit performs the coordinate transformation on the captured image data according to an instruction from the CPU, which is based on an operation signal from the operation panel or the image recognition section, so that perspective transformed image data is produced. The perspective transformed image data is stored in the output buffer memory of the image processing section and is output to a monitor according to an instruction from the CPU, which is based on an operation signal from the operation panel or the image recognition section. When an operator confirms that the captured image of the squared inspection drawing displayed on the monitor is distorted, a value (F value) regarding a distance between a lens position and a light-receiving surface, which is input to the operation panel, is increased or decreased. Such operation is repeated so as to correct the distortion in the captured image, so the captured image can be transformed into a central projection image.

By using a recording medium storing such procedures for correcting the distortion in the captured image, it is possible to automate the correction processing.

Thus, the invention described herein makes possible the advantages of providing: an imaging system in which a lens position for producing a central projection image is not limited to one point and the central projection image is produced under a condition where a lens is focused onto an entire surface of a hyperboloidal mirror; software used for controlling data representing the produced image; a method for correcting distortion in an image captured by the imaging system; and a recording medium storing procedures for such a method.

These and other advantages of the present invention will become apparent to those skilled in the art upon reading and understanding the following detailed description with reference to the accompanying figures.

BRIEF DESCRIPTION OF THE DRAWINGS

FIG. 6 is a schematic diagram for explaining an imaging mechanism and a magnification of an image when a single lens is used.

FIG. 12 illustrate an example of data organization in a transformation table for r[α] stored in an LUT 10.

DESCRIPTION OF THE PREFERRED EMBODIMENTS

Hereinafter, examples of the present invention will be described with reference to the drawings.

Figure 1:
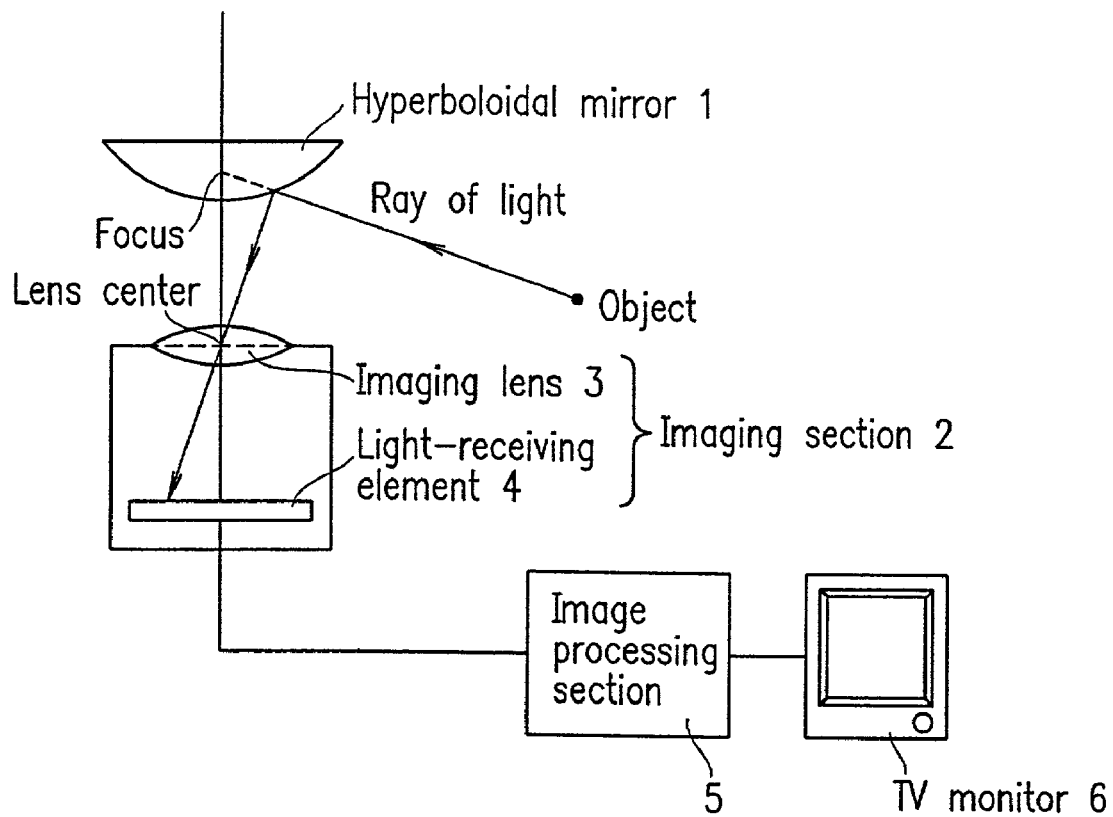
FIG. 1 is a diagram for explaining a basic structure and geometric positional relationship among components of an imaging system 100 according to an example of the present invention.

FIG. 1 is a diagram for explaining a basic structure and geometric positional relationship among components of an imaging system 100 according to an example of the present invention.

The imaging system 100 includes a hyperboloidal mirror 1, an imaging section 2 (including an imaging lens 3 and a light-receiving element 4), an image processing section 5, and a TV monitor 6.

The hyperboloidal mirror 1 is a reflecting mirror having a geometry of the first sheet of a two-sheeted hyperboloid. A general expression of a two-sheeted hyperboloidal function is represented by the following Expression (3):

$$(X^2+Y^2)/a^2 - z^2/b^2 = -1 \qquad (3).$$

Figure 2:
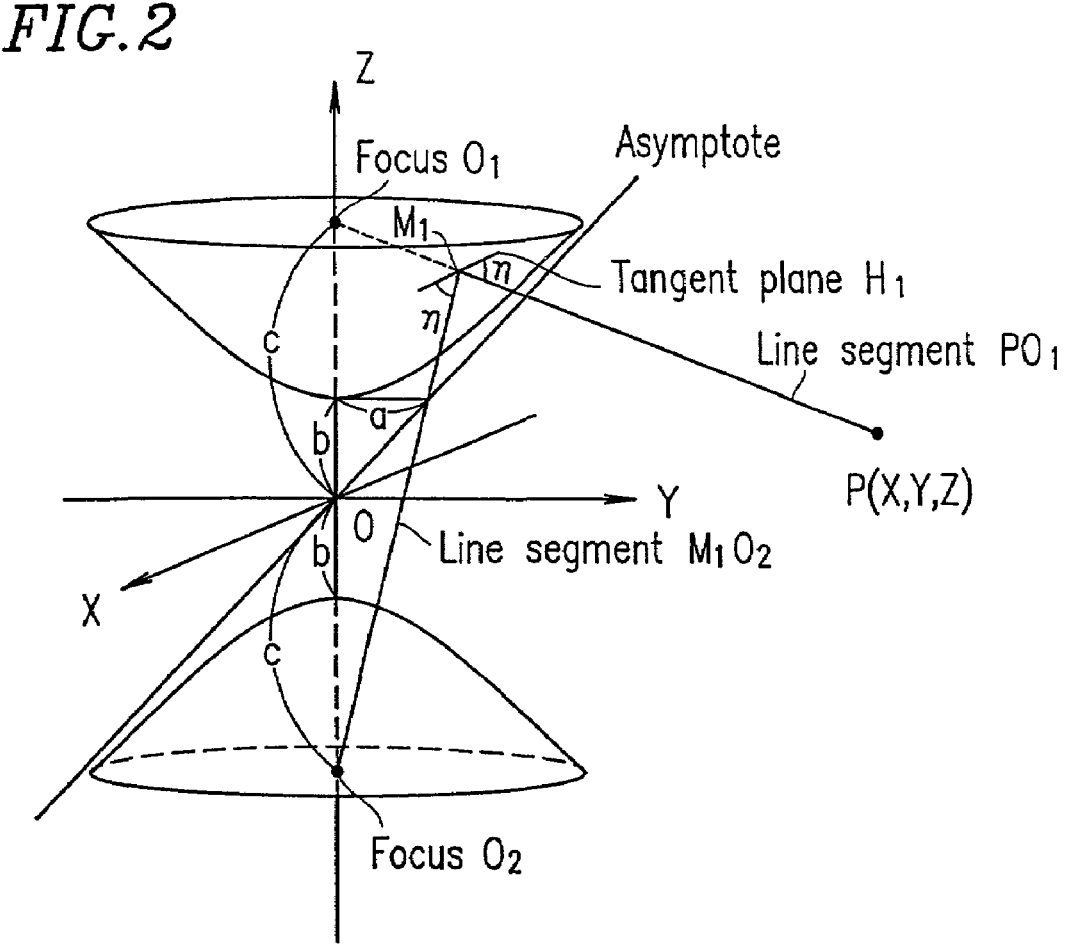
FIG. 2 illustrates a two-sheeted hyperboloid when graphically representing Expression (3) (described later).

FIG. 2 illustrates a two-sheeted hyperboloid when graphically representing Expression (3).

The two-sheeted hyperboloid illustrated in FIG. 2 has a rotation axis along the Z-axis, focus $O_1$ on the Z-axis in a positive direction, and focus $O_2$ on the Z-axis in a negative direction. Positions of foci $O_1$ and $O_2$ are respectively represented by focus $O_1=(0,0,c)$ and focus $O_2=(0,0,-c)$ in a system of coordinates of X, Y and Z.

The value c is represented by $c=\sqrt{(a^2+b^2)}$, where a and b are constants defining a geometry of a hyperboloid. Hereinafter, a, b and c are referred to as mirror constants.

A point of intersection between line segment $PO_1$ extending between focus $O_1$ and an arbitrary point $P(X,Y,Z)$ on the outside of the hyperboloid and the hyperboloid satisfying Expression (3) is referred to by point $M_1$. A ray of light represented by line segment $PO_1$ is incident on tangent plane $H_1$ of the hyperboloid which is in contact with line segment $PO_1$ at Point $M_1$. An incident angle ($\eta$) formed by line segment $PO_1$ with tangent plane $H_1$ is equivalent to a reflecting angle ($\eta$) at which a ray of light represented by line segment $M_1O_2$ exits the hyperboloid. Line segment $M_1O_2$ always passes through focus $O_2$ of the second sheet of the two-sheeted hyperboloid.

Figure 3:
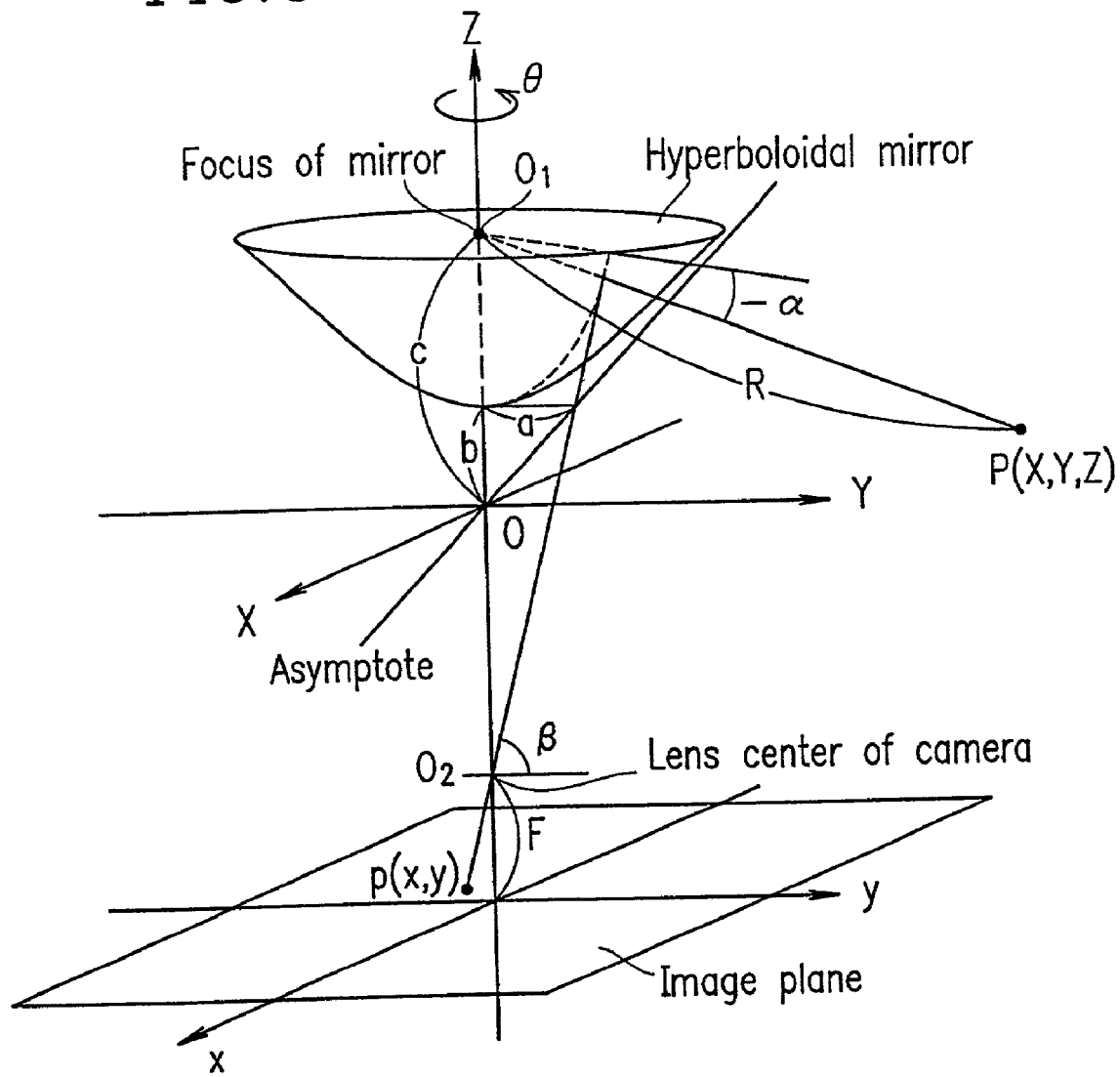
FIG. 3 is a diagram for explaining a lens position of an imaging system which satisfies the requirements for central projection.

FIG. 3 is a diagram for explaining a lens position of the imaging system which satisfies the requirements for the central projection. It is most important to arrange the center of the imaging lens in the position of focus $O_2$ of the second sheet of the two-sheeted hyperboloid which forms a counterpart to focus $O_1$ of the hyperboloidal mirror. An input image (captured image) obtained via a light-receiving element having a light-receiving surface at a position at distance F from the lens center is called a central projection image.

A positional relationship between a coordinate $P(x,y)$ of the input image and a position $P(X,Y,Z)$ of an object can be represented by the above-described Expressions (1) and (2), which are reproduced below for convenience:

$$x = \frac{F \times (b^2 - c^2) \times X}{(b^2 + c^2) \times (Z - c) - 2 \times b \times c \times \sqrt{X^2 + Y^2 + (Z - c)^2}}; \quad (1)$$

$$y = \frac{F \times (b^2 - c^2) \times Y}{(b^2 + c^2) \times (Z - c) - 2 \times b \times c \times \sqrt{X^2 + Y^2 + (Z - c)^2}}. \quad (2)$$

Expressions (1) and (2) are obtained, based on the positional relationship among elements shown in FIGS. 2 and 3, using the following Expressions (4), (5), and (6):

$$Z = R \tan \alpha + c, \text{ if } R = \sqrt{(X^2 + Y^2)} \quad (4)$$

$$\tan \alpha = \frac{(b^2 + c^2)\sin\beta - 2bc}{(b^2 - c^2)\cos\beta}; \quad (5)$$

$$\beta = \tan^{-1}\frac{F}{r}, \text{ if } r = \sqrt{(x^2 + y^2)}. \quad (6)$$

An input image which satisfies the requirements for the central projection is an image simultaneously satisfying Expressions (4) through (6). By using Expressions (4) through (6), the input image can be readily transformed to a perspective image which can be seen from focus $O_1$. Such transformation is called a perspective transformation. An image (perspective image) produced by the perspective transformation is an image which can be usually seen by the human eye. In such an image, a three-dimensional space is projected onto a two-dimensional space.

Distance F is a vertical distance from the lens center to an imaging surface of the light-receiving element. Angle $\alpha$ is an angle formed by a horizontal plane including a focus of the mirror with line segment $PO_1$. Angle $\beta$ is a zenithal angle when an incident point on the mirror is seen from the center of an imaging mechanism. The input image is obtained by capturing a virtual image reflected in the mirror by the lens.

Figure 4:
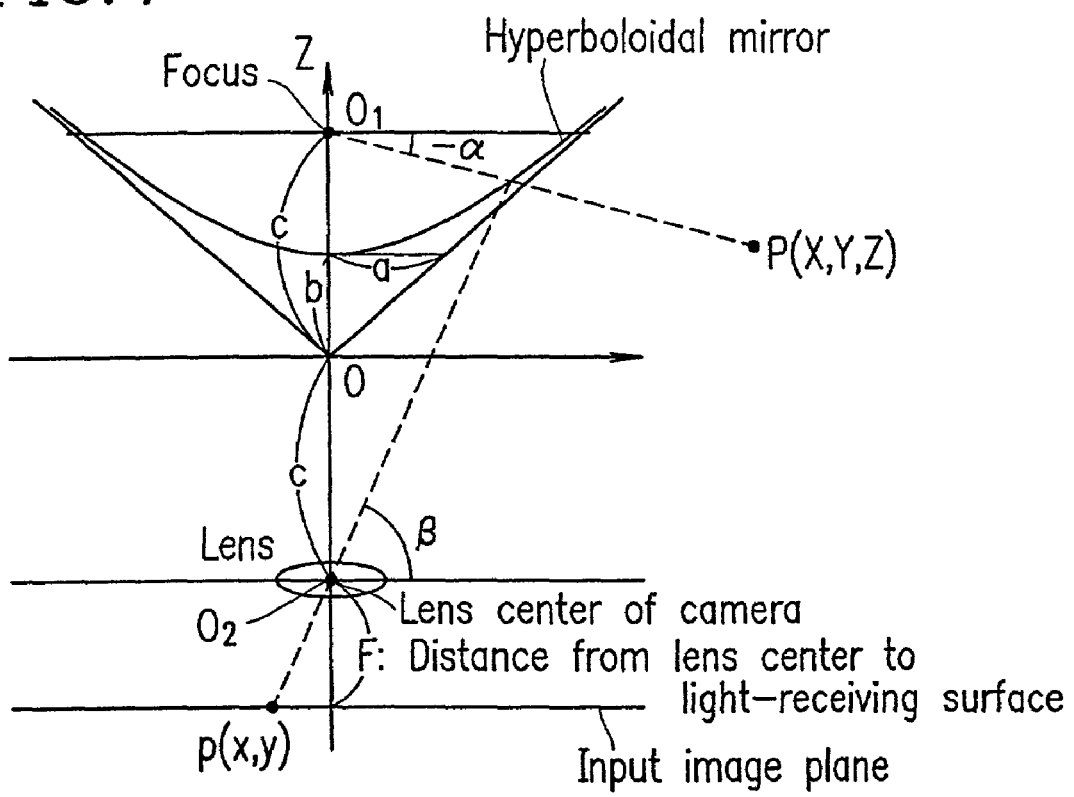
FIG. 4 is a cross-sectional view for explaining a lens position of an imaging system which satisfies the requirements for central projection.

FIG. 4 is a cross-sectional view for explaining a lens position of the imaging system which satisfies the requirements for central projection.

Figure 5:
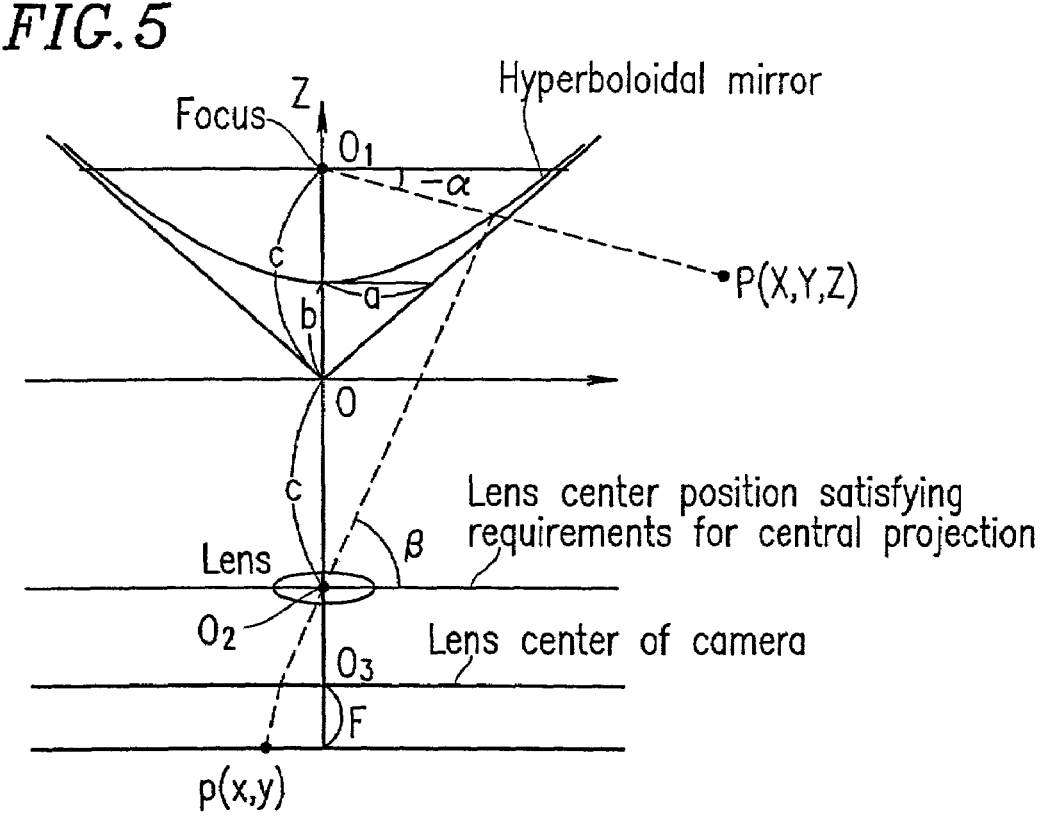
FIG. 5 is a cross-sectional view for explaining a lens position of an imaging system which does not satisfy the requirements for central projection.

FIG. 5 is a cross-sectional view for explaining a lens position of the imaging system which does not satisfy the requirements for central projection.

FIGS. 4 and 5 differ from each other in that an imaging lens shown in FIG. 5 is shifted from position $O_2$ which essentially satisfies the central projection to position $O_3$. The position of the imaging lens shown in FIG. 5 may be shifted to a hyperboloidal mirror side or an opposing side.

In the following description, a case where the lens position is shifted from the lens center position satisfying the requirements for the central projection to the opposing side with respect to the hyperboloidal mirror by distance L is studied. In this example, only the lens position is shifted from the lens center position satisfying the requirements for the central projection and the position $P(X,Y,Z)$ of the object remains as it is.

Referring to FIG. 6, description is given as to how an image reflected in the hyperboloidal mirror is reflected in the light-receiving surface in each of the cases shown in FIGS. 4 and 5. FIG. 6 is a schematic diagram for explaining an imaging mechanism and a magnification of an image when a single lens is used.

In FIG. 6, object A is a virtual image reflected in the hyperboloidal mirror. FIG. 6 shows lens positions $O_2(A)$ and $O_3(A)$, focal distance f of the lens, distance $S_2$ from lens position $O_2(A)$ to object A, and distance $S_3$ from lens position $O_3(A)$ to object A.

When the lens is in position $O_2$, an image at point H of object A is produced at point $H_2$. When the lens is in position $O_3$, a ray of light via point H of object A extends through point $O_2$ and further extends until reaching point L on the lens, so that the ray of light is refracted by the lens and an image is produced at point $H_3$. This imaging point H3 is readily obtained by the following Expression (7):

$$1/S + 1/M = 1/f \quad (7).$$

In Expression (7), S is the distance from a lens position to object A, F is the distance from the lens position to the imaging surface, and f is the focal distance of the lens. A magnification m is obtained by the following expression (8):

$$m = f/(S - f) \quad (8).$$

Accordingly, magnification $m_2$ of an image produced in the case where the lens is in lens position $O_2(A)$ is represented by $m_2 = f/(S_2 - f)$, and magnification $m_3$ of an image produced in the case where the lens is in lens position $O_3(A)$ is represented by $m_3 = f/(S_3 - f)$.

In the case where the length of object A is H, the image produced when the lens is in lens position $O_2(A)$ has length $h_2$ represented by $h_2 = m_2 \times H$ and the image produced when the lens is in lens position $O_3(A)$ has length $h_3$ represented by $h_3 = m_3 \times H$. Each of lengths $h_2$ and $h_3$ of the images represents a distance from an optical axis to the vertex of the image (i.e., a distance from the Z-axis to the vertex of the image), and thus can be represented by $\sqrt{(x_2+y_2)}$ (the radius) in Expression (6).

Since only a value of distance F is different in each lens position, a relationship between the length of the image produced when the lens is in position $O_2$ and the length of the image produced when the lens is in position $O_3$ is represented by $h_2/h_3=(S_2+L-f)/(S_2-f)$ from Expressions (1) and (2). This expression represents that when lens position $O_3$ is located in a position shifted from the position satisfying the requirements for central projection by distance L, a size of an obtained input image (captured image) is a constant multiple of a size of an input image obtained when the lens position satisfies the requirements for central projection.

When the lens is not in the position satisfying the requirements for central projection, as described above, a position coordinate $\sqrt{(x_2+y_2)}$ of the input image is different from a position coordinate of the input image obtained when the lens is in the position satisfying the requirements for central projection, only by a constant multiple. Thus, by representing distance F, which is a distance from the lens position which does not satisfy the requirements for central projection to the imaging surface, as represented in Expression (6), using distance $F_0$, which is a distance from the lens position satisfying the requirements for central projection to the imaging surface, it is possible to realize a means for transforming an input image (captured image) into a central projection image, which satisfies the requirements for central projection, using software. That is, according to the present invention, the F value can be optionally selected depending on a change in an optical system while the F value represents a fixed distance (i.e., $F_0$ as described above) from the optical system of the lens to an imaging surface in conventional technologies.

For example, in the case of introducing a magnification variable ε, it is possible to replace F with ε×F and adjust the distance from the optical system of the lens to the imaging surface by changing the variable ε. Alternatively, by representing the F value using $F=F_0+\Delta F$, it is possible to adjust the distance from the optical system of the lens to the imaging surface by changing ΔF by a suitable distance (e.g., by a unit of picture elements (pixels)).

Figure 7A:
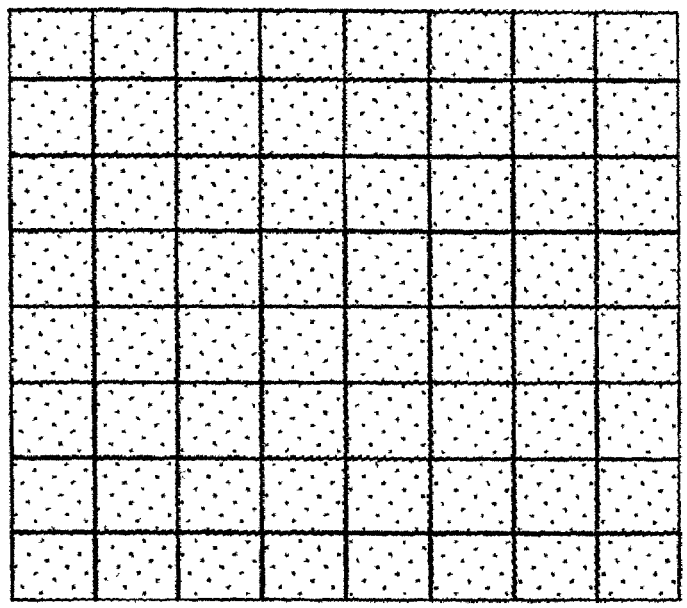
FIG. 7A illustrates an example of a squared inspection drawing.
Figure 7B:
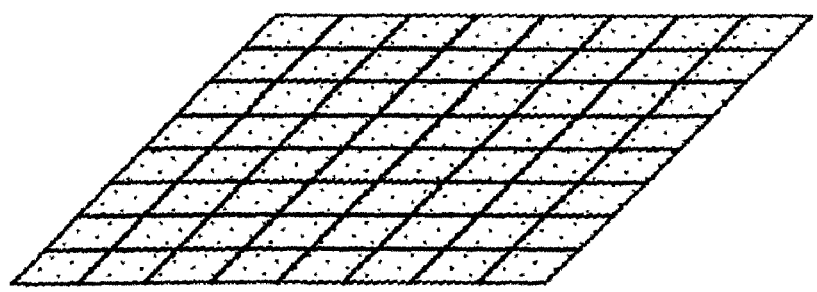
FIG. 7B illustrates another view of the squared inspection drawing of FIG. 7A.

As an example of methods for setting an optimum F value, there is a method which uses an inspection drawing which includes square subdivisions (hereinafter, referred to as a "squared inspection drawing"), as illustrated in FIGS. 7A and 7B. FIG. 7A illustrates a top view of the squared inspection drawing. FIG. 7B illustrates a perspective view of the squared inspection drawing.

Figure 8A:
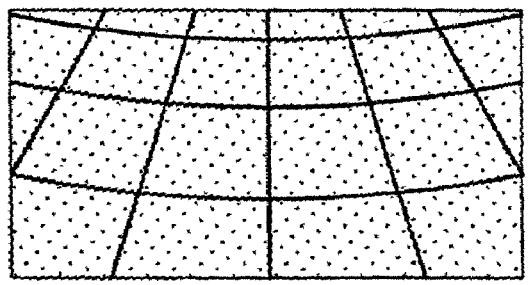
FIG. 8A illustrates a perspective image of the squared inspection drawing of FIGS. 7A and 7B.
Figure 8B:
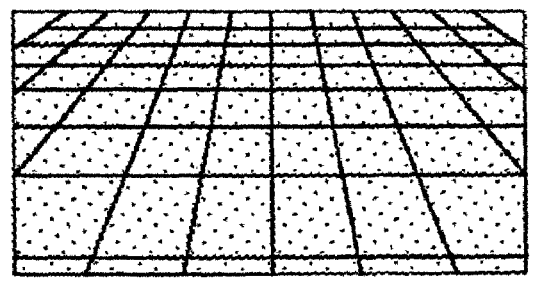
FIG. 8B illustrates another perspective image of the squared inspection drawing of FIGS. 7A and 7B.
Figure 8C:
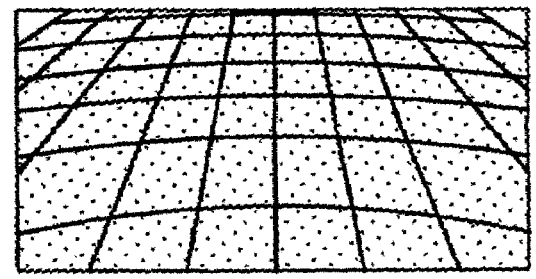
FIG. 8C illustrates still another perspective image of the squared inspection drawing of FIGS. 7A and 7B.

FIGS. 8A, 8B, and 8C, respectively, illustrate perspective images of the squared inspection drawing. FIG. 8A illustrates an image (with pincushion distortion) of the inspection drawing, where the F value<an optimum value (e.g., the lens position is shifted by about 0.4 mm to about 0.7 mm from the lens position satisfying the requirements for central projection to the hyperboloidal mirror side). FIG. 8B illustrates an image of the inspection drawing, where the F value=an optimum value. FIG. 8C illustrates an image (with barrel distortion) of the inspection drawing, where the F value>an optimum value (e.g., the lens position is shifted by about 0.4 mm to about 0.7 mm from the lens position satisfying the requirements for central projection to the light-receiving element side).

Prior to setting the F value, the imaging system captures an image of the inspection drawing. The F value is adjusted such that, when the perspective transformation is performed on the captured image so as to produce a perspective image, the perspective image includes accurate square subdivisions (i.e., the image illustrated in FIG. 8B is obtained).

Figure 9:
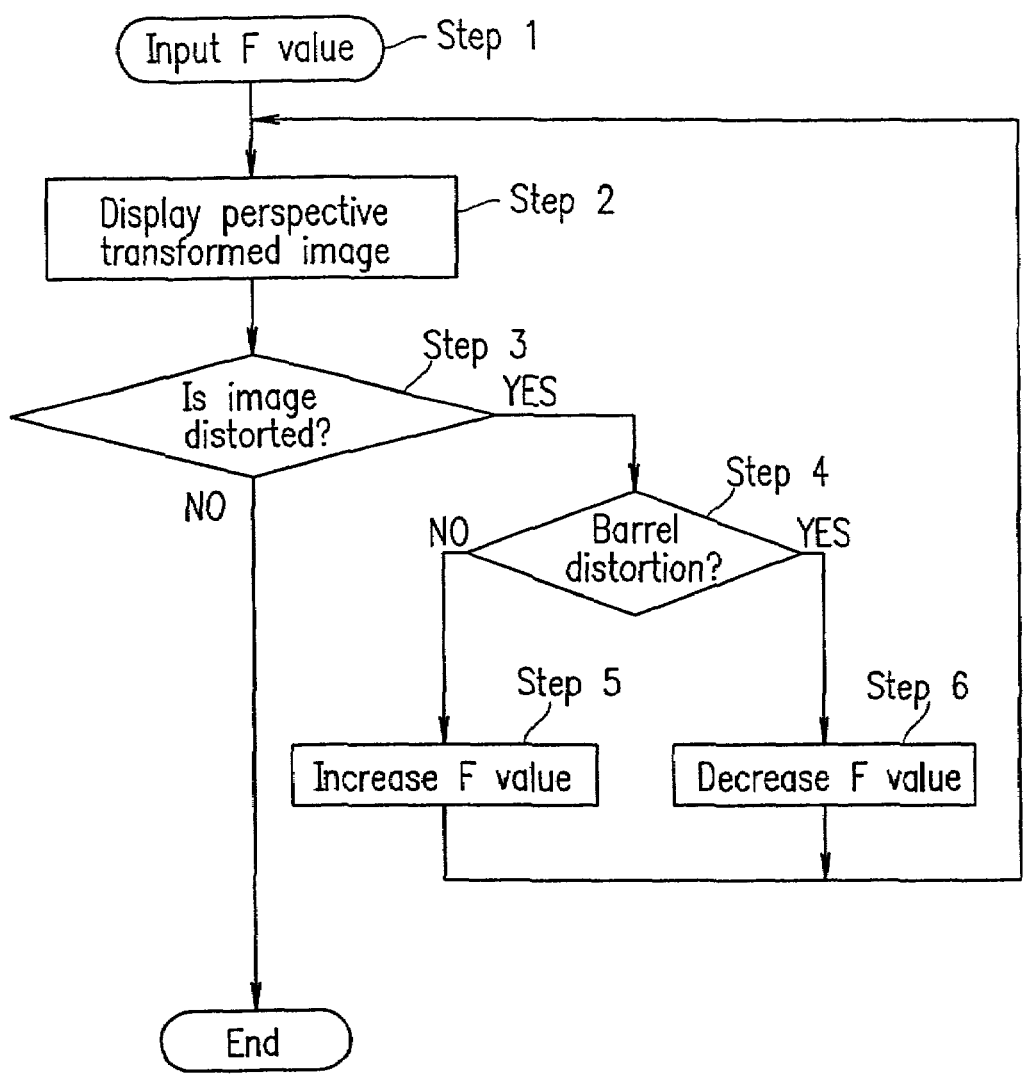
FIG. 9 is a flowchart for explaining a procedure for changing an F value.

FIG. 9 is a flowchart for explaining a procedure for changing the F value. A squared inspection drawing as described above is created and an image of the squared inspection drawing is captured by the imaging system prior to setting of the F value.

At step 1, distance F from a principal point of a lens prior to setting of the F value to an imaging surface is input to an image processing section of the imaging system. Alternatively, distance F may be input to the image processing section by an operator using an operation panel or a distance preset by software (program) may be input to an arithmetic processing circuit in the image processing section.

At step 2, a perspective transformed image of an inspection drawing is displayed.

At step 3, whether or not the image is distorted, that is, whether or not square subdivisions are accurately displayed is determined.

When the image is distorted, at step 4, whether or not the type of the distortion is barrel distortion is determined.

When the distortion is barrel distortion, at step 5, the F value is decreased.

When the distortion is not barrel distortion (i.e., it is pincushion distortion), at step 6, the F value is increased.

Steps 2 through 4 and steps 5 or 6 are repeated so as to fix the F value for displaying the square subdivisions with the greatest possible accuracy. In this example, although the squared inspection drawing is used, a dappled inspection drawing (including staggered patterns of different shades of color) can be used. Other patterns can be used so long as straight lines along horizontal and vertical directions can be clearly distinguished.

Figure 10:
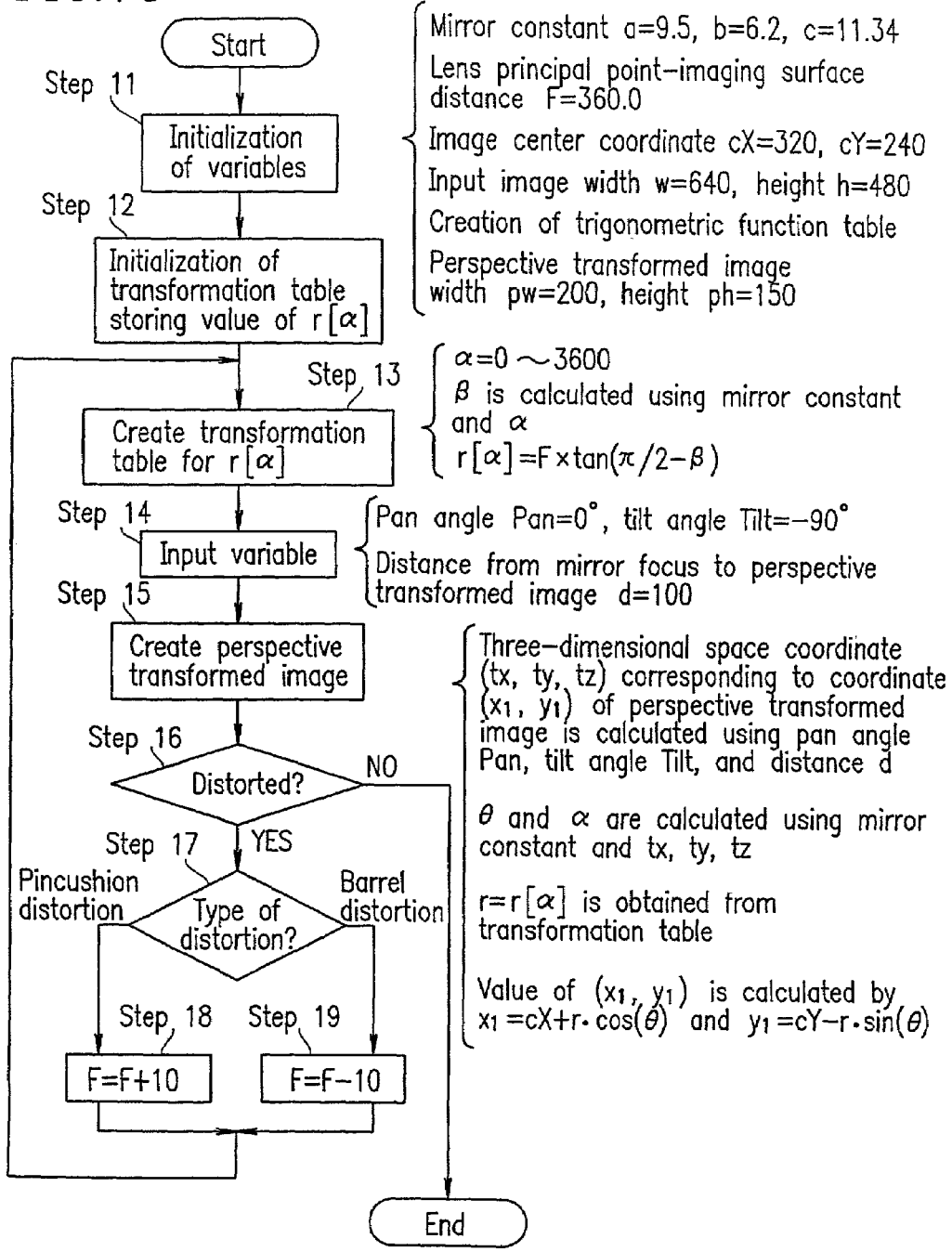
FIG. 10 is a flow chart for explaining a detailed procedure for changing an F value.

FIG. 10 is a flow chart for explaining a detailed procedure for changing an F value.

At step 11, the variables are initialized. The initialized variables include mirror constants, a distance between a principal point of a lens and an imaging surface (hereinafter, referred to as a "lens principal point-imaging surface distance"), a center coordinate of a perspective transformed image, width and height of an input image, and a trigonometric function table (these are included in a look-up table, hereinafter referred to as an "LUT", and are required to be initialized since they are recalculated when the F value is changed). The initialized variables also include width and height of a perspective transformed image, etc.

The initialization of these variables can be automatically performed by software (program). In this example, values of the variables are set as follows: mirror constant, a=9.5, b=6.2, and c=11.34; lens principal point-imaging surface distance, F=360.0 (equivalent to the number of pixels of a CCD camera); image center coordinate, cX=320, cY=240; width of input image, w=640; height of input image, h=480; width of perspective transformed image, pw=200, and height of perspective transformed image, ph=150 (equivalent to the number of pixels of the CCD camera). The trigonometric function table is also created.

At step 12, a transformation table storing values for r[α] (r represents a distance from an object to the center of an image plane, and a represents a tilt angle) is initialized.

At step 13, the transformation table for r[α] is compiled. In this example, the value of α is set so as to be between 0° and 360° in 0.10° increments, and, from Expression (5), β is calculated using the mirror constants and α. From Expression (6), r[α] is calculated by $r[\alpha]=F\times\tan(\pi/2-\beta)$.

At step 14, variables, such as a pan angle, a tilt angle (α), and a distance d from a mirror focus to a perspective transformed image, are input. In this example, values of the variables are as follows: pan angle, Pan=0°; tilt angle, Tilt=−90°; and a distance from mirror focus to a perspective transformed image, d=100.

At step 15, a perspective transformed image is created. A three-dimensional space coordinate (tx,ty,tz) corresponding to a coordinate $(x_1,y_1)$ of the perspective transformed image is calculated using the pan angle Pan, the tilt angle Tilt, and the distance d. This calculation can be performed according to $d=\sqrt{(tx^2+ty^2+(tz-c)^2)}$, $\tan \alpha=(tz-c)/\sqrt{(tx^2+ty^2)}$, $\sin \alpha=tz/d$, and $c=\sqrt{(a^2+b^2)}$.

Figure 14:
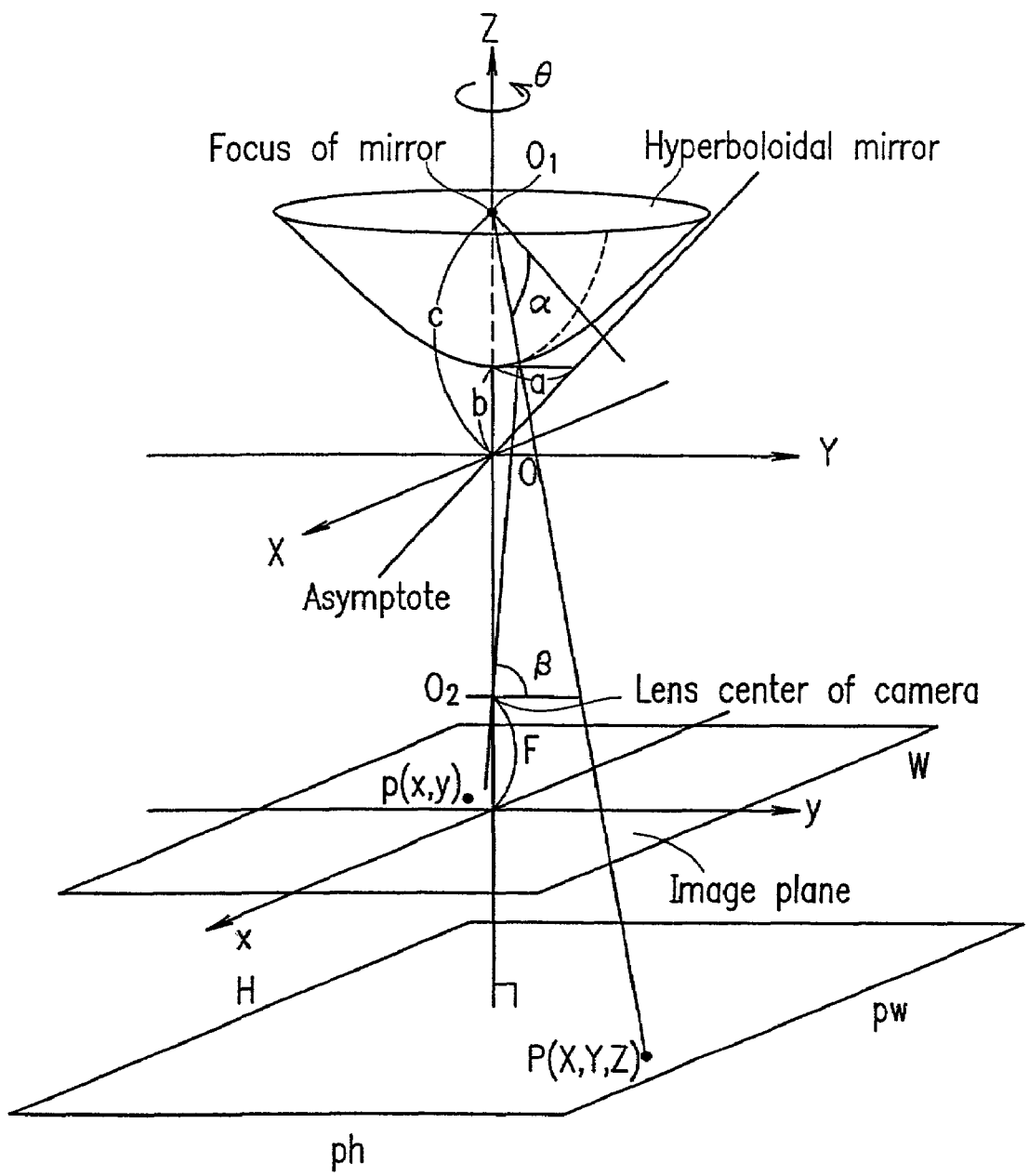
FIG. 14 is a diagram for explaining an image plane of a CCD camera and a perspective transformed screen.

In this example, as shown in FIG. 14, a size of an image plane of a CCD camera can be represented by W×H. The center coordinate can be represented by (cX,cY). A size of a perspective transformed screen assumed to be in a three-dimensional space can be represented by ph×pw.

In this example, a plane perpendicular to the z-axis (tilt angle=90°) is assumed to be the perspective transformed screen. A coordinate on a CCD screen corresponding to each pixel on the assumed screen is calculated using Expression (1) and (2). In this assumed screen, a rotation angle about the coordinate axis z is the pan angle. When the coordinate axes x and y of the assumed screen respectively correspond to coordinate axes x and y of the CCD light-receiving surface, the pan angle is zero (Pan=0). A rotation angle θ (a rotation angle about the z-axis shown in FIG. 3) and an angle α are calculated using the mirror constants tx, ty, and tz. The angle a can be calculated using Expressions (5) and (6). The rotation angle θ can be obtained by $\tan^{-1}(y/x)$. Furthermore, r=r[α] is derived from the transformation table, and then the values of $(x_1,y_1)$ are calculated by x=cX+r×cos(θ) and y=cY−r×sin(θ).

At step 16, whether or not the image is distorted is determined. When the image is not distorted, the processing ends.

When the image is distorted, at step 17, whether the type of the distortion is barrel distortion or pincushion distortion is determined.

When the distortion is pincushion distortion, at step 18, the F value is increased.

When the distortion is barrel distortion, at step 19, the F value is decreased.

In this example, an adjustment distance (ΔF in $F=F_0+\Delta F$) of the F value is increased or decreased by a value equivalent to 10 picture elements (pixels) which is equivalent to an adjustment of substantially between 40 μm and 70 μm. Steps 13 through 17 and steps 18 or 19 are repeated so as to fix the F value for displaying the square subdivisions with the greatest possible accuracy.

Figure 11:
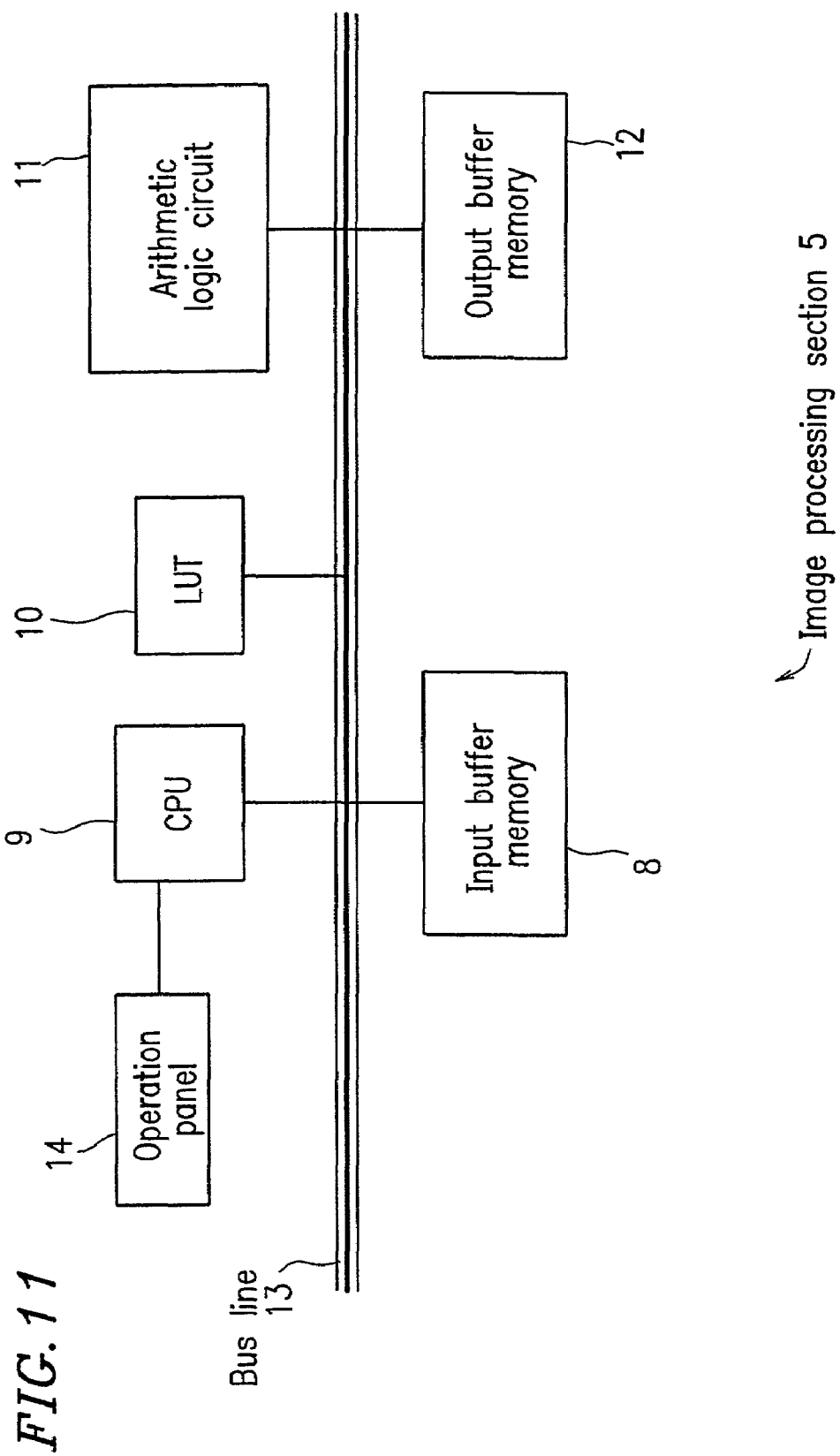
FIG. 11 is a block diagram illustrating a structure of an image processing section according to the present invention.

The adjustment processing of the F value in this example can be performed using, for example, an image processing section and an operation panel connected thereto, as illustrated in FIG. 11.

FIG. 11 is a block diagram illustrating a structure of an image processing section 5 according to the present invention. The image processing section 5 includes an input buffer memory 8, a CPU 9, an LUT 10, an arithmetic logic circuit 11, an output buffer memory 12, a bus line 13, and an operation panel 14.

Image data representing an image of an inspection drawing captured by an imaging system is stored in the input buffer memory 8, and thereafter, according to an instruction from the CPU 9 which is based on an operation signal from the operation panel 14, coordinate transformation is performed on the image data by the arithmetic logic circuit 11 based on data stored in the LUT 10. The LUT 10 has the transformation table for r[α] stored therein.

FIG. 12 illustrates an example of data organization in the transformation table for r[α] stored in the LUT 10.

The data representing perspective transformed image produced by the coordinate transformation is input to the output buffer memory 12 and then, the perspective transformed image is displayed on the monitor according to the instruction by the CPU 9. The operator (inspector) confirms whether or not the image displayed on the monitor is distorted. When the image is distorted, whether the type of the distortion is barrel distortion (see FIG. 8C) or pincushion distortion (see FIG. 8A) is determined. The operator operates the operation panel so as to increase or decrease the F value according to the type of distortion.

For example, when the distortion is pincushion distortion, by operating the operation panel so as to increase the F value, the operation panel transmits an operation signal to the CPU 9. The operation signal is further transmitted via the bus line from the CPU 9 to the arithmetic logic circuit 11. The F value is increased in the arithmetic logic circuit 11 and the coordinate transformation is performed on the image data. Data representing the perspective transformation image produced after the F value has been increased is input to the output buffer memory 12. Then, the image is output to the monitor according to the instruction by the CPU 9. The operator (inspector) confirms the decrease in the distortion in the image on the monitor. This operation is repeated until the distortion is minimized.

By performing the adjustment processing of the F value according to the present invention during shipping inspection of a product (imaging system), even if the lens position is shifted, it is still possible to optimize the F value and obtain a central projection image, thereby facilitating optical adjustments. As a result, production yield is improved. In this case, the imaging system can perform the coordinate transformation on captured image data based on the optimized F value, so that the perspective image data is obtained. Thus, the operation panel may not be provided to the imaging system. Alternatively, even when the operation panel is provided to the imaging system and a user operates the operation panel so as to change the lens distance according to the purpose, a central projection image substantially free from distortion can be obtained.

In this example, although a case where the inspector confirms the distortion of the image by observing the image on the monitor has been described, by using the image recognition section so as to compare expected image data prestored in a storage section to image data obtained by arithmetic processing, distortion in the image may be detected and an operation signal to increase or decrease the F value may be output.

Figure 13A:
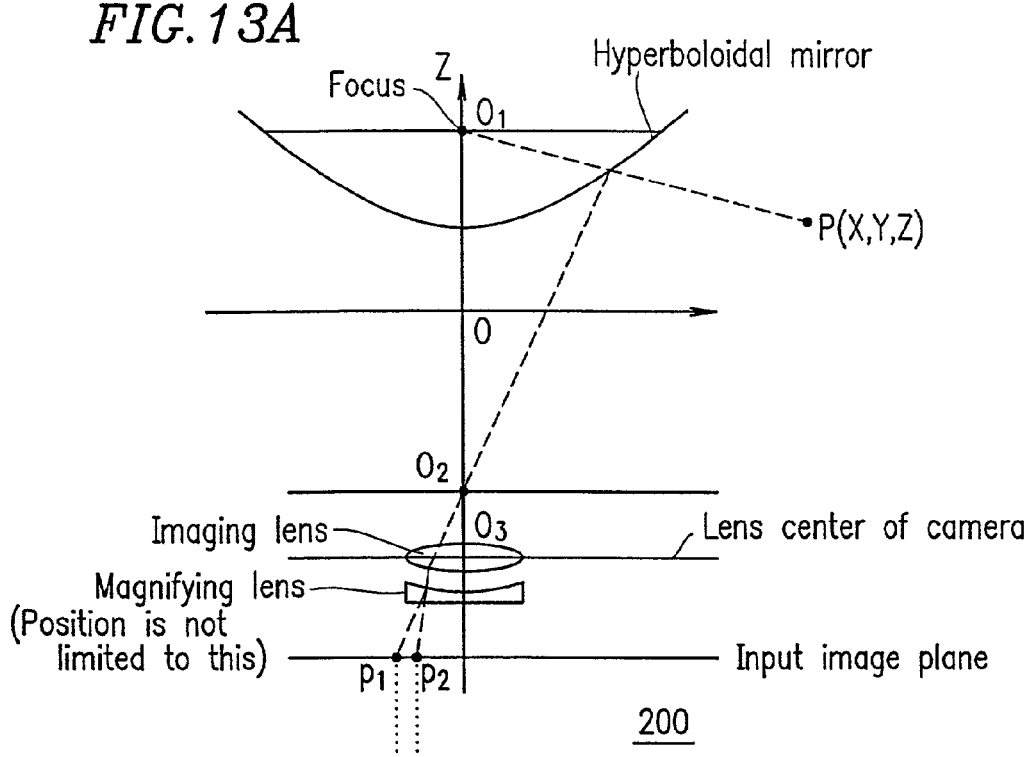
FIG. 13A is a diagram for explaining an imaging system 200 according to the present invention incorporating a magnifying lens.
Figure 13B:
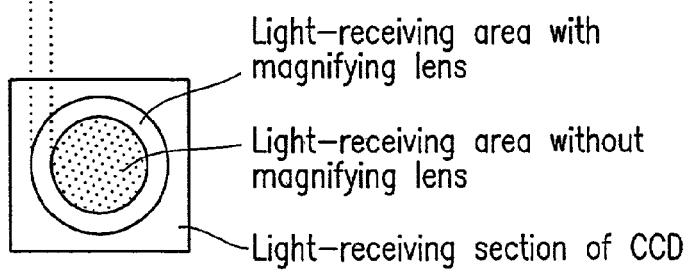
FIG. 13B is another diagram for explaining the imaging system 200 incorporating the magnifying lens.

FIGS. 13A and 13B are diagrams for explaining an imaging system 200 incorporating a magnifying lens.

When the lens center is moved from $O_2(A)$ to $O_3(A)$, an image reflected in a light-receiving section of a CCD camera or the like is reduced. As a result, pixels of the light-receiving section of the CCD camera or the like cannot be effectively utilized, thereby reducing resolution of the image. In such a case, by inserting the magnifying lens in front of or behind the imaging lens and adjusting the position of the magnifying lens by moving the magnifying lens back and forth along the z-axis shown in FIG. 13A, a size of the image can be optimized, as illustrated in FIG. 13B. It is understood that, in order to enlarge a range to be in focus, an aperture diaphragm is inserted in front of or behind the lens, so that the depth of focus can be made deeper.

The present invention can increase a distance from an image reflected in a hyperboloidal mirror to a lens, and thus it is possible to eliminate a need for a specially-processed lens and to obtain a satisfactory image using an ordinary lens. Moreover, by increasing the distance, it is possible to eliminate a need for adjusting the aperture diaphragm so as to reduce an effective aperture of the lens, thereby extremely lowering limits of imaging requirements, so that adjustments are facilitated.

Moreover, the present invention can readily satisfy requirements for central projection by adjusting a lens such that the lens is initially in a prescribed position, and then changing the F value for image processing, the optical adjustment step can be shortened. The adjustment accuracy for producing the central projection image can be improved.

Various other modifications will be apparent to and can be readily made by those skilled in the art without departing from the scope and spirit of this invention. Accordingly, it is not intended that the scope of the claims appended hereto be limited to the description as set forth herein, but rather that the claims be broadly construed.

What is claimed is:

1. An imaging system, comprising:
a reflecting mirror having a geometry of one of two sheets of a two-sheeted hyperboloid; and
an imaging section which includes an imaging device for receiving light concentrated by a lens having a center located in any position opposing the reflecting mirror on a rotation axis of the reflecting mirror,
wherein the imaging system includes a correction section for performing coordinate transformation on captured image data obtained by capturing an image of a prescribed inspection drawing so as to produce a perspective transformed image data and for correcting distortion in the captured image based on a relationship between a value F regarding a distance between a lens position adapted for the coordinate transformation and a light-receiving surface of the imaging device that does not satisfy requirements for central projection onto the light-receiving surface and a value $F_0$ regarding a distance between a lens position and a light-receiving surface of the imaging device that satisfies requirements for central projection onto the light-receiving surface.

2. An imaging system according to claim 1, wherein the coordinate transformation is performed on the captured image data so as to produce the perspective transformed image data using the following expression:

$$x = \frac{F \times (b^2 - c^2) \times X}{(b^2 + c^2) \times (Z - c) - 2 \times b \times c \times \sqrt{X^2 + Y^2 + (Z-c)^2}}, \quad (1)$$

$$y = \frac{F \times (b^2 - c^2) \times Y}{(b^2 + c^2) \times (Z - c) - 2 \times b \times c \times \sqrt{X^2 + Y^2 + (Z-c)^2}}, \quad (2)$$

(where (X,Y,Z) represents a position of an object, a, b and c are mirror constants, (x, y) represents a coordinate of the captured image, and F represents a distance between the lens position and the light-receiving surface of the imaging device).

3. An imaging system according to claim 1, wherein a squared inspection drawing is used as the inspection drawing.

4. An imaging system according to claim 1, wherein the correction section comprises:
an image processing section for transforming the captured image data into the perspective transformed image data so as to produce a perspective transformed image; and
an operation panel for inputting an instruction to increase or decrease the value regarding the distance between the lens position and the light-receiving surface of the imaging device.

5. An imaging system according to claim 1, wherein the correction section comprises:
an image processing section for transforming the captured image data into the perspective transformed image data so as to produce a perspective transformed image; and
an image recognition section for recognizing whether or not the produced perspective transformed image is distorted by comparing the produced perspective transformed image to an image expected to be obtained when the captured image is a central projection image.

6. An imaging system according to claim 4, wherein the image processing section performs coordinate transformation processing according to an instruction signal output by the operation panel.

7. An imaging system according to claim 5, wherein the image processing section performs coordinate transformation processing according to an instruction signal output by the image recognition section.

8. An imaging system according to claim 4, wherein the image processing section comprises:
a CPU connected to a bus line;
an input buffer memory;
a look-up table;
an arithmetic processing circuit; and
an output buffer memory,
wherein:
the CPU controls arithmetic processing;
the input buffer memory stores captured image data;
the look-up table and the arithmetic processing circuit are used for the arithmetic processing; and
the output buffer memory includes the image processing section for storing perspective transformed image data.

9. An imaging system according to claim 5, wherein the image processing section comprises:
a CPU connected to a bus line;
an input buffer memory;
a look-up table;
an arithmetic processing circuit; and
an output buffer memory,
wherein:
the CPU controls arithmetic processing;
the input buffer memory stores captured image data;
the look-up table and the arithmetic processing circuit are used for the arithmetic processing; and
the output buffer memory includes the image processing section for storing perspective transformed image data.

10. A program embodied in a computer readable medium used for controlling image data in an imaging system, wherein the imaging system comprises:
a computer;
a reflecting mirror having a geometry of one of two sheets of a two-sheeted hyperboloid; and
an imaging section which includes an imaging device for receiving light concentrated by a lens having a center located in any position opposing the reflecting mirror on a rotation axis of the reflecting mirror, and the program allows the computer to serve as:
a coordinate transformation section for performing coordinate transformation on captured image data obtained by capturing an image of a prescribed inspection drawing so as to produce perspective transformation image data;
a correction section for correcting distortion in the captured image based on a relationship between a value F regarding a distance between a lens position adapted for the coordinate transformation and a light-receiving surface of the imaging device that does not satisfy requirements for central projection onto the light-receiving surface and a value $F_o$ regarding a distance between a lens position and a light-receiving surface that satisfies requirements for central projection onto the light-receiving surface.

11. A method for correcting a captured image in an imaging system, wherein the imaging system comprises:
a reflecting mirror having a geometry of one of two sheets of a two-sheeted hyperboloid; and
an imaging device for receiving light concentrated by a lens having a center located in any position opposing the reflecting mirror on a rotation axis of the reflecting mirror,
the method comprising:
a first step of storing captured image data obtained by capturing an image of a prescribed inspection drawing in an input buffer memory;
a second step of performing coordinate transformation, according to an instruction from a CPU responding to an instruction signal output by an operation panel, on the captured image data stored in the input buffer memory using an arithmetic processing circuit so as to produce perspective transformed image data and storing the perspective transformed image data in an output buffer memory; and
a third step of displaying an image produced from the perspective transformed image data stored in the output buffer memory on a monitor, the image being confirmed by an inspector,
wherein:
when a perspective transformed image obtained by capturing an image of a squared inspection drawing is determined to be distorted at the third step, the inspector inputs to the operation panel an instruction to increase or decrease a value regarding a distance between the lens position and the light-receiving surface of the imaging device such that the operation panel outputs an instruction signal to change the value regarding the distance between the lens position and the light-receiving surface of the imaging device; and
the first through third steps are repeated until the value regarding the distance between the lens position and the light-receiving surface satisfies requirements for central projection onto the light-receiving surface.

12. A method for correcting a captured image in an imaging system, wherein the imaging system comprises:
a reflecting mirror having a geometry of one of two sheets of a two-sheeted hyperboloid; and
an imaging device for receiving light concentrated by a lens having a center located in any position opposing the reflecting mirror on a rotation axis of the reflecting mirror,
the method comprising:
a first step of storing captured image data obtained by capturing an image of a prescribed inspection drawing in an input buffer memory;
a second step of performing coordinate transformation, according to an instruction from a CPU responding to an instruction signal output by an image recognition section, on the captured image data stored in the input buffer memory using an arithmetic processing circuit so as to produce perspective transformed image data and storing the perspective transformed image data in an output buffer memory; and
a third step for comparing the perspective, transformed image data stored in the output buffer memory to expected image data obtained when a captured image is a central projection image by using the image recognition section,
wherein:
when a perspective transformed image obtained by capturing an image of a squared inspection drawing is determined to be distorted at the third step, the image recognition section outputs the instruction signal so as to change the value regarding the distance between the lens position and the light-receiving surface of the imaging device; and
the first through third steps are repeated.

13. An imaging system for transforming captured image data into perspective transformed image data, the system comprising:
an imaging section having a correction section for correcting distortion in the captured image data using a value regarding a distance between a light-receiving surface of an imaging device and a lens position,
wherein the correction section corrects distortion when a perspective transformed image obtained by capturing an image of a prescribed inspection, drawing is not determined to be distorted using a method for correcting distortion of a captured image according to claim 11.

14. An imaging, system for transforming captured image data into perspective transformed image data, the system comprising:
an imaging section having a correction section for correcting distortion in the captured image data using a value regarding a distance between a light-receiving surface of an imaging device and a lens position,
wherein the correction section corrects distortion when a perspective transformed image obtained by capturing an image of a prescribed inspection drawing is not determined to be distorted using a method for correcting distortion of a captured image according to claim 12.

15. A program embodied in a computer-readable medium for correcting a captured image in an imaging system, wherein the imagine system includes a reflecting mirror having a geometry of one of two sheets of a two-sheeted hyperboloid, and an imaging device for receiving light concentrated by a lens having a center located in any position opposing the reflecting mirror on a rotation axis of the reflecting mirror, the program comprising:
code that stores captured image data obtained by capturing an image of a prescribed inspection drawing in an input buffer memory;
code that performs coordinate transformation on the captured image data stored in the input buffer memory so as to produce perspective transformed image data;
code that stores the perspective transformed image data in an output buffer memory;
code that displays an image produced from the perspective transformed image data stored in the output buffer memory on a monitor; and code that modifies a value regarding a distance between the lens position and a light receiving surface of the image device based on a distortion in perspective transformed obtained by capturing an image of a squared inspection drawing, until the value regarding the distance between the lens position and the light-receiving surface satisfies requirements for central projection onto the light-receiving surface.

16. A program embodied in a computer-readable medium for correcting a captured image in an imaging system, wherein the imaging system includes a reflecting mirror having a geometry of one of two sheets of a two-sheeted hyperboloid, and an imaging device for receiving light concentrated by a lens having a center located in any position opposing the reflecting, mirror on a rotation axis of the reflecting mirror, the program comprising:

code that stores captured image data obtained by capturing an image of a prescribed inspection drawing in an input buffer memory;

code that performs coordinate transformation on the captured image data, stored in the input buffer memory so as to produce perspective transformed image data;

code, that stores the perspective transformed image data in an output buffer memory;

code that compares the perspective transformed image data stored in the output buffer memory to a expected image data obtained when a captured image is a central projection image by using an image recognition section; and code that changes a value regarding the distance between the lens position and a light receiving surface of the imaging device based on a distortion of a perspective transformed image obtained by capturing an image of a squared inspection drawing.

17. An imaging system, comprising:

a reflecting mirror having a geometry of one of two sheets of a two-sheeted hyperboloid; and an imaging section which includes an imaging device for receiving light concentrated by a lens having a center located in any position opposing the reflecting mirror on a rotation axis of the reflecting mirror;

an image processing section for transforming the captured image data into the perspective transformed image data so as to produce a perspective transformed image; and an image recognition section for recognizing whether or not the produced perspective transformed image is distorted by comparing the produced perspective transformed image to an image expected to be obtained when the captured image is a central projection image, wherein the imaging system includes a correction section for performing coordinate transformation on captured image data obtained by capturing an image of a prescribed inspection drawing so as to produce a perspective transformed image data and for correcting distortion in the captured image based on a value regarding a distance between a lens position adapted for the coordinate transformation and a light-receiving surface of the imaging device.

18. An imaging system for transforming captured image data into perspective transformed image data, the system comprising:

an imaging section having a correction section for correcting distortion in the captured image data using a value regarding a distance between a light-receiving surface of an imaging device and a lens position, wherein the correction section corrects distortion when a perspective transformed image obtained by capturing, an image of a prescribed inspection drawing is not determined to be distorted using a method for correcting distortion of a captured image comprising:

a first step of storing captured image data obtained by capturing an image of a prescribed inspection drawing in an input buffer memory;

a second step of performing coordinate transformation, according to an instruction from a CPU responding to an instruction signal output by an operation panel, on the captured image data stored in the input buffer-memory using an arithmetic processing circuit so as to produce perspective transformed image data and storing the perspective transformed image data in an output buffer memory; and a third step of displaying an image produced from the perspective transformed image data stored in the output buffer memory on a monitor, the image being confirmed by an inspector, wherein:

when a perspective transformed image obtained by capturing an image of a squared inspection drawing is determined to be distorted at the third step, the inspector inputs to the operation panel an instruction to increase or decrease a value regarding a distance between the lens position and the light-receiving surface of the imaging device such that the operation panel outputs an instruction signal to change the value regarding the distance between the lens position and the light-receiving surface of the imaging device; and the first through third steps are repeated.

* * * * *